June 13, 1961
G. P. DIRTH ET AL
2,988,680
HIGH-GAIN QUICK-RESPONSE CONTROL
SYSTEM FOR STRIP MILL
Filed Feb. 27, 1959
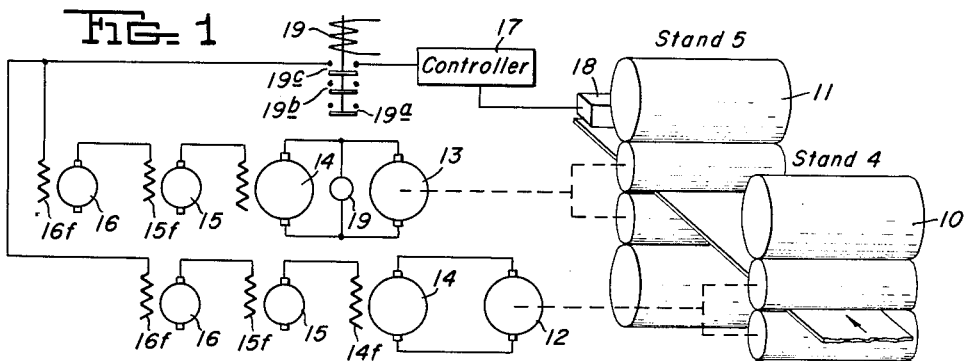
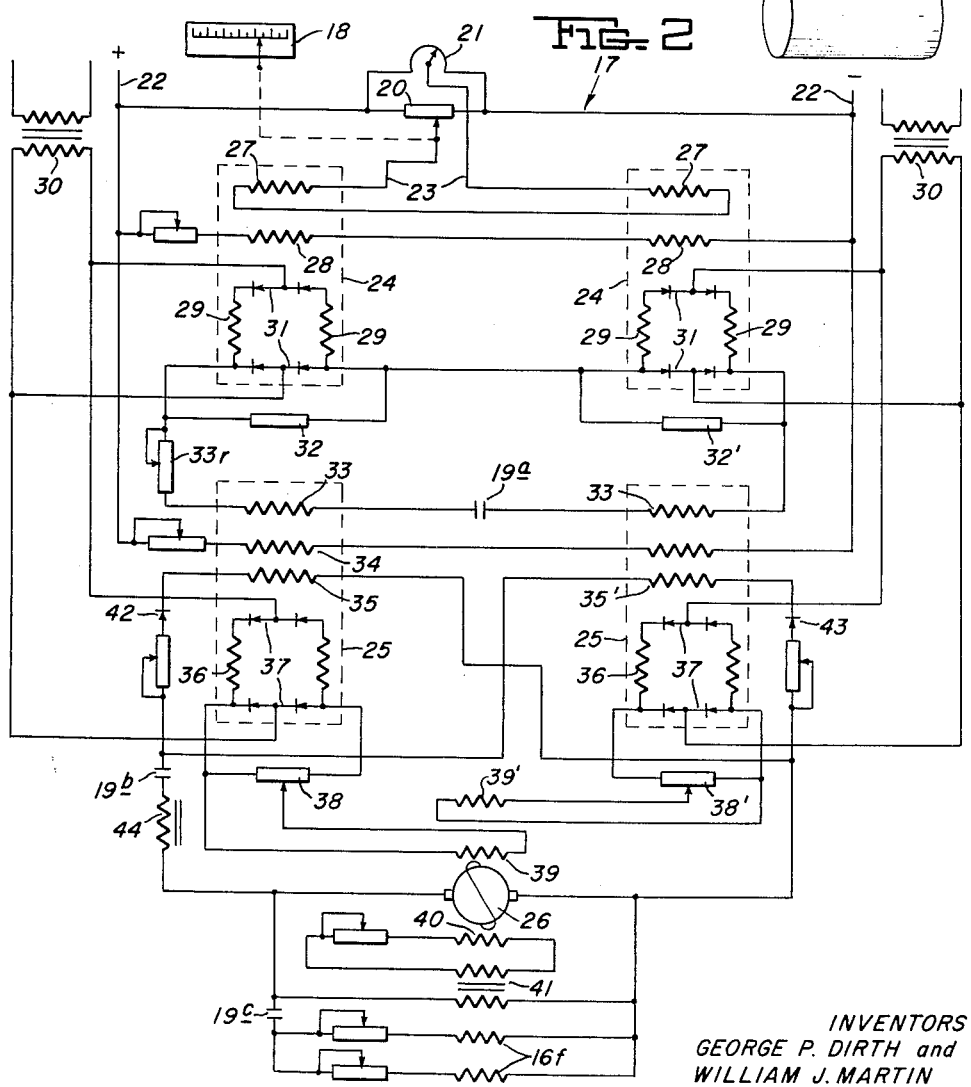
INVENTORS
GEORGE P. DIRTH and
WILLIAM J. MARTIN
By Donald G. Dalton
Attorney

United States Patent Office 2,988,680
Patented June 13, 1961

2,988,680
HIGH-GAIN QUICK-RESPONSE CONTROL SYSTEM FOR STRIP MILL
George P. Dirth, 867 Holly Hill Drive, Walnut Creek, Calif., and William J. Martin, 2300 Crescent Drive, Concord, Calif.
Filed Feb. 27, 1959, Ser. No. 796,052
1 Claim. (Cl. 318—6)

This invention relates to a system for controlling the speeds of the motors driving certain stands of a multistand continuous strip cold-rolling mill in order to maintain the gage of the finished strip at a constant value within close tolerances.

It is known that the gage of strip passing through a cold-reduction mill may be controlled by varying the tension on the strip between stands or on the strip issuing from the last stand. Automatic control systems utilizing this principle have been proposed. One such is disclosed and claimed in the copending application of George P. Dirth et al. Serial No. 775,422, filed November 21, 1958. We have invented an improvement on the system there disclosed which is particularly applicable to mills rolling steel strip for tin plate. Such mills effect a reduction of up to 90% in the thickness of the starting material (pickled, hot-rolled steel strip) and thus require a quicker response and a higher gain in a controller for the stand motors, in order to correct gage variations immediately on the occurrence thereof so that the amount of off-gage material produced will be held to a minimum. It is accordingly the object of our invention to provide a speed controller for mill motors characterized by a quick response to an initiating signal and having a high gain in the corrective effect set in operation thereby.

A complete understanding of the invention may be obtained from the following detailed description and explanation which refer to the accompanying drawings illustrating the present preferred embodiment. In the drawings:

FIGURE 1 is a diagrammatic illustration of the last two stands of a continuous strip cold-rolling mill with their driving motors, their supply generators and a gager governing a controller therefor; and FIGURE 2 is a complete circuit of the gager and controller.

Referring now in detail to the drawings and for the present, to FIGURE 1, a continuous strip cold-rolling mill includes stands 10 and 11 which may, for example, be the fourth and fifth stands of a five-stand mill. The stands are driven by motors 12 and 13, respectively, and each motor is supplied with current by a generator 14, driven by any convenient source of power. The speeds of the motors are controlled by varying the voltages of the generators and this is done by varying the excitation of their field windings 14f. For this purpose, each generator has an exciter 15 provided with an auxiliary control field winding 15f in addition to its main field winding, now shown. The excitation and polarity of windings 15f are governed by a rotating regulator or pilot exciter 16 having a field winding 16f. The armatures of exciters 15 and 16 are driven by a separate motor not shown. The energization and polarity of field winding 16f are governed by a controller 17, shown in detail in FIGURE 2, which is under the control of gager 18. This gager (e.g., that made by Industrial Nucleonics, Inc., and designated "Accuray") is mounted to measure the thickness of the finished strip issuing from the last stand 11. A relay 19 is connected across the armature of generator 14 supplying motor 13, for a purpose which will appear later.

Referring now to FIGURE 2, gager 18, in addition to giving a visual indication, actuates the moving element of a variable resistor 20. This resistor is connected to a potentiometer 21 to form a Wheatstone bridge. The potentiometer is manually preset to give a voltage corresponding to the desired finished gage of the strip. Direct voltage is applied across the bridge by a source 22 to which its opposite ends are connected. Any change in the position of the moving element of resistor 20 effected by gager 18, from that in which a balance is maintained with potentiometer 21, causes a control voltage to appear across circuit 23 connected to the moving elements of the resistor or potentiometer.

The controller 17 which we employ to vary the degree of excitation and polarity of field windings 16f includes first-stage magnetic amplifiers 24, second-stage amplifiers 25, both of which may be of the type made by General Electric Co., known as "Amplistat," and a rotating regulator 26, such as General Electric Co.'s "Amplidyne," driven by any convenient means, not shown. Amplifiers 24 and 25 are saturable-core reactors having input or control, biasing, output and other windings thereon as will now be explained. Control windings 27 of amplifiers 24 are connected in series across circuit 23 and are thus energized by the signal voltage appearing in that circuit upon departure of the gage of the finished strip for the predetermined value as explained above. Biasing windings 28 on amplifiers 24 are connected in series with a rheostat across direct-current supply circuit 22. The windings 27 are connected oppositely, as shown, relative to windings 28, the winding 27 of one amplifier bucking the winding 28 and that of the other boosting winding 28.

Output windings 29 on each amplifier 24 determine the portion of an alternating voltage from a source 30 which is applied to a full-wave rectifier 31. Thus the voltage across circuit 23 is amplified and is applied by each amplifier 24 to one of two load resistors 32 and 32'. The polarities of the rectifiers are opposite and the resultant of the opposed IR drops across these resistors is applied to the control windings 33 of amplifiers 25, connected in series, the circuit including also a coupling resistor 33r and contacts 19a of relay 19. These contacts are closed when the voltage across motor 13 is above about 50% of the normal value corresponding to full speed. Thus relay 19 cuts out the controller 17 during periods when the mill is stopped or is being threaded with a fresh coil of strip.

Amplifiers 25 have biasing windings 34 connected in series across supply circuit 22, and feedback windings 35 and 35' the connection and purpose of which will be explained later. The amplifiers are also provided with output windings 36 and rectifiers 37 of the same polarity connected across transformers 30. The output voltages of the rectifiers of amplifiers 25 are applied to load resistors 38 and 38', respectively. Voltages taken off from points spaced along these resistors are applied to field windings 39 and 39' of the regulator 26 which are connected to exert magnetizing forces in opposition to each other. The magnetizing force exerted at any time by windings 39 and 39' determines the polarity and voltage generated by regulator 26 and applied to the field windings 16f of pilot exciters 16 which are connected thereto. The regulator has a stabilizing field 40 energized by a transformer 41 connected across the regulator armature.

It will be noted that a change of the gage of the strip in one direction, say toward excessive thickness, will cause the output voltage of one amplifier to increase and that of the other to decrease. These changes are amplified by amplifiers 25 and the amplified changes show up in changes in the energizations of field windings 39 and 39', thus giving a high gain and quick response in effect on the speeds of motors 12 and 13.

It will be further noted that feedback winding 35 is connected across regulator 26 in series with a rectifier 42. Winding 35' is similarly connected in series with a rectifier 43. An inductance 44 is in circuit with both windings and the regulator through a second set of contacts 19b on relay 19. Inductance 44 serves to delay changes of current through windings 35 and 35'. Rectifiers 42 and 43 are disposed to conduct in opposite directions. Thus, when the polarity of regulator 26 is as indicated by + and − signs on the drawing, winding 35 is energized but winding 35' is not. Conversely, when the polarity of regulator 26 is reversed from that shown, winding 35' will be energized and winding 35 will not.

The controller 17 described above functions to produce a voltage across regulator 26 which varies in polarity and magnitude with the signal voltage across circuit 23. This latter voltage is determined, as already explained, by departures of the gage of the finished strip from the desired value. If the strip gage is excessive at a given time, regulator 26 quickly develops an output voltage of the polarity indicated which promptly accelerates motors 12 and 13, thus increasing the tension on the strip between stands and the reduction effected by the stands. This tends to bring the strip gages quickly back to the desired value. As the gage correction proceeds, the initiating signal voltage decreases but feedback winding 35 maintains a corrective effect on its amplifier. Winding 35', by reason of rectifier 43 receives no current from regulator 26.

If the strip gage runs below the desired value, the signal voltage is of opposite polarity from that caused by overgage strip and, when amplified, shows up as a voltage across regulator 26 of a polarity opposite that shown. This decreases the excitation of generators 14, acting through exciters 16 and 15 in turn. As a result, the speeds of motors 12 and 13 are decreased and this reduces the tension on the strip to correct for the undergage condition. Feedback winding 35' maintains proper energization of the field of regulator 26 as the gage comes back to normal and the signal voltage diminishes. Winding 35 is prevented by rectifier 42 from receiving current from the regulator during correction for an undergage condition.

A third set of contacts 19c on relay 19 disconnects windings 16f from regulator 26 when the mill is running at a speed considerably below normal.

It will thus be apparent that any signal voltage across circuit 23, regardless of polarity, will be amplified by first-stage amplifiers 24 and then again by second-stage amplifiers 25, giving a high overall voltage gain. The outputs of the two latter will be applied to the reversely connected field windings 39 and 39', assuring a quick response of the voltage of regulator 26. Thereafter, the feedback winding of only one of the amplifiers 25 continues to be effective as the gage comes back to normal, i.e., winding 35 in case of correction of overgage and winding 35' in the case of correction of undergage. As a result, after a correction for overgage or undergage, although the initiating signal disappears eventually, the feedback winding serves to hold the correction which has been effected, until a subsequent departure from desired gage occurs. This reduces any tendency of the system to hunt continuously between the established gage and the actual gage of the finished strip at any instant. Operation of the correcting devices thus occurs only when a departure from desired gage occurs.

The system of our invention has an advantage in addition to its high gain and quick response. By providing the two amplifiers 25 and energizing the feedback winding of only one for a correction of excessive gage and of the other for correcting undergage, we obtain proper feedback action regardless of the polarity of the voltage of regulator 26. In other words, the feedback effect is the result of saturation curves of the same slope in both cases.

Although we have disclosed herein the preferred embodiment of our invention, we intend to cover as well any change or modification therein which may be made without departing from the spirit and scope of the invention.

We claim:

A control system for a motor driving a strip mill, comprising a pair of first-stage amplifiers responsive to a voltage proportional to the departure from a predetermined value of the thickness of the strip issuing from the mill, said amplifiers including output rectifiers of opposed polarity, a pair of second-stage magnetic amplifiers having input windings connected to the output circuits of said first-stage amplifiers, and a rotating regulator controlling the voltage applied to said motor, said regulator having field windings connected to the output circuits of said second-stage amplifiers, respectively, in reverse order relative to each other, said second-stage amplifiers having feedback windings connected across said regulator, and a unidirectional conducting means in series with each feedback winding, said last-mentioned means being disposed in opposite directions relative to each other.

References Cited in the file of this patent
UNITED STATES PATENTS

| | | |
|---|---|---|
| 1,969,536 | Winne | Aug. 7, 1934 |
| 2,491,984 | King et al. | Dec. 20, 1949 |
| 2,663,841 | Harding et al. | Dec. 22, 1953 |